United States Patent [19]

Naito

[11] Patent Number: 5,422,754
[45] Date of Patent: Jun. 6, 1995

[54] OPTICAL TRANSMISSION LINE RELAYED WITH MULTISTAGE OPTICAL AMPLIFIERS

[75] Inventor: Takao Naito, Kawasaki, Japan

[73] Assignee: Fujitsu Limited, Kawasaki, Japan

[21] Appl. No.: 34,384

[22] Filed: Mar. 18, 1993

[30] Foreign Application Priority Data

Mar. 19, 1992 [JP] Japan .................. 4-062872

[51] Int. Cl.⁶ .............. H04B 10/00; G02B 6/26
[52] U.S. Cl. .................. 359/341; 359/174; 359/337
[58] Field of Search ............. 359/174, 341, 337

[56] References Cited

U.S. PATENT DOCUMENTS

| | | | |
|---|---|---|---|
| 4,720,160 | 1/1988 | Hicks | 359/337 |
| 5,115,338 | 5/1992 | DiGiovanni et al. | 359/337 |
| 5,117,303 | 5/1992 | Desurvire et al. | 359/341 |
| 5,140,656 | 8/1992 | Hasegawa et al. | 385/24 |
| 5,260,823 | 11/1993 | Payne et al. | 359/341 |

OTHER PUBLICATIONS

Saito et al., "2.5 Gbit/s, 80–100 km Spaced In–Line Amplifier Transmission Experiments over 2.500–4.500 km," *17th European Conference on Optical Communication ECOC '91*, 3 Post-Deadline Papers, Sep. 12, 1991, Paris, France, pp. 68–71.

S. Shimada, IEEE Trans. on Parallel and Distributed Systems, May 1, 1990, #2, p. 75.

Murakami et al, IEEE Photonics Tech. Lett, vol. 4, #11, pp. 1269–1272, Nov. 1992. Abst. only provided herewith.

*Primary Examiner*—Nelson Moskowitz
*Attorney, Agent, or Firm*—Staas & Halsey

[57] ABSTRACT

An optical transmission line relayed with multistage optical amplifiers wherein the plurality of optical amplifiers inserted in the optical transmission line include at least two types mixed together: first optical amplifiers including broad band optical filters and second optical amplifiers including narrow band optical filters, whereby the amount of amplified spontaneous emission (ASE) from the optical amplifiers is reduced overall without applying any major frequency band limitation to the signal light spectrum.

19 Claims, 15 Drawing Sheets

5,422,754

OPTICAL TRANSMISSION LINE RELAYED WITH MULTISTAGE OPTICAL AMPLIFIERS

BACKGROUND OF THE INVENTION

1. Field of the Invention

The present invention relates to an optical transmission line wherein signal light is relayed by optical amplifiers linked together.

In the past, for long distance optical communications, the general practice was to perform optical-electrical conversion at predetermined intervals so as to process the signals as electrical signals to reproduce them, then perform electrical-optical conversion and once again send the converted signals on to the next regenerative repeater.

In recent years, however, optical amplifiers have been able to be realized at low cost, so development is being made of commercial optical transmission lines with multistage optical AMP's connected in cascade instead of the regenerative repeaters. Optical amplifiers are simple in circuit construction compared with the conventional regenerative repeaters, so are higher in reliability and further are lower in costs, so are particularly suitable when used for long distance ocean optical transmission lines.

2. Description of the Related Art

In general, optical transmission lines relayed with multistage optical amplifiers, as explained in detail later, are comprised of an optical transmission line (optical fiber) and a plurality of optical amplifiers connected in cascade along the optical transmission line. Signal light is transmitted from the input end of the optical transmission line and is relayed successively by the optical amplifiers until it reaches the output terminal of the optical transmission line. The input end is provided with an optical transmitter, while the output terminal side is provided with an optical receiver.

In such an optical transmission line relayed with optical amplifiers linked together, each time light is relayed and amplified by the different stages of the optical amplifiers, the amplified spontaneous emission (ASE) increases monotonously. Along with this monotonous increase in the amount of ASE, the nonlinear effects of phase noise, which is caused by the Kerr effect, increase. The nonlinear effects are proportional to the optical power of the amount of ASE of the output signal light from the output terminal of the optical transmission line, so the nonlinear effects increase proportionally with the integral value of the amount of ASE along with distance.

The easiest way to reduce the integral value of the amount of ASE along with distance is to reduce the bandwidths of the optical filters provided in the different stages of optical amplifiers. However, if the bandwidths of the optical filters are reduced across the board, there is the new problem that wave distortion occurs in the output signal light. This is because if the bandwidths of the optical filters are reduced across the board, there is a large frequency band limitation in the signal light spectrum.

SUMMARY OF THE INVENTION

Therefore, the present invention was made in consideration of the above problems and has as its object the provision of an optical transmission line relayed with multistage optical amplifiers which can reduce the amount of ASE.

To achieve the above-mentioned object, the present invention provides an optical transmission line relayed with multistage optical amplifiers which are comprised of a combination of both a plurality of optical filters including the center frequency of the signal light and having a bandwidth sufficient for the transmission and a plurality of other optical filters including the center frequency of the signal light and having a variety of types of bandwidths narrower than the above bandwidths.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the prior art and the problems therein will be first described with reference to the related figures.

Figure 1:
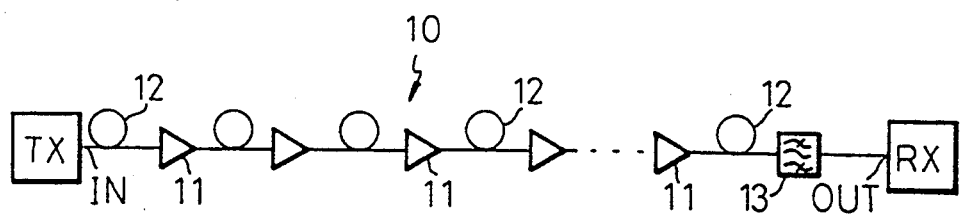
FIG. 1 is a view showing a general optical transmission line relayed with multistage optical amplifiers.

FIG. 1 is a view of a general optical transmission line relayed with multistage optical amplifiers. In the figure, 10 is an optical transmission line relayed with multistage optical amplifiers and is comprised of an optical transmission line (optical fiber) 12 and a plurality of optical amplifiers 11 connected in cascade along the optical transmission line 12. Signal light is sent from an input end IN of the optical transmission line 12 and is relayed by the optical amplifiers 11 to reach the output terminal OUT of the optical transmission line 12. Note that the input end IN side is provided with the optical transmitter (TX), while the output terminal OUT side is provided with the optical receiver (RX). Reference numeral 13 in the figure is an optical filter which is usually provided just before the receiver (RX).

Figure 2:
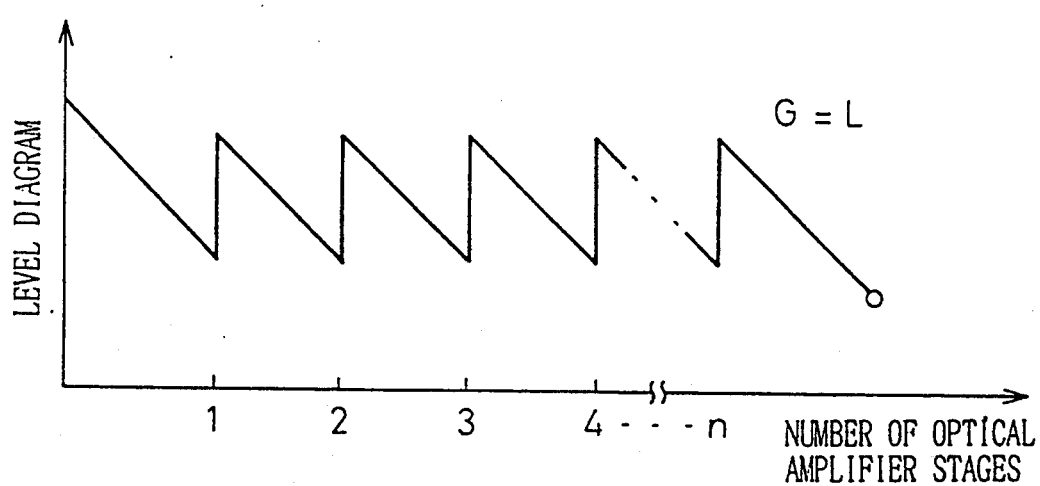
FIG. 2 is a level diagram showing the changes in the level along the transmission line 10 in FIG. 1.

FIG. 2 is a level diagram showing the changes in level along the optical transmission line 10 in FIG. 1. The light amplifying gain (G) of the optical amplifiers 11 and the optical loss (L) at the optical transmission line 12 is considered to be equal (G=L). These values are, for example, G=20 dB and L=20 dB. Further, the noise figure (NF) of the optical amplifiers 11 is considered 8 dB.

In the optical transmission line relayed by multistage multistage optical amplifiers shown in FIG. 1, however, the ASE generated at the optical amplifiers 11 becomes noise, so there is the problem that the S/N ratio of the signal light deteriorates.

Due to the self phase modulation caused by the so-called Kerr effect and other nonlinear effects of the optical transmission line (optical fiber) 12, an expansion of the spectrum of the signal light occurs. This expansion of the spectrum causes deterioation of the receiving sensitivity of the optical receiver (RX).

Figure 3:
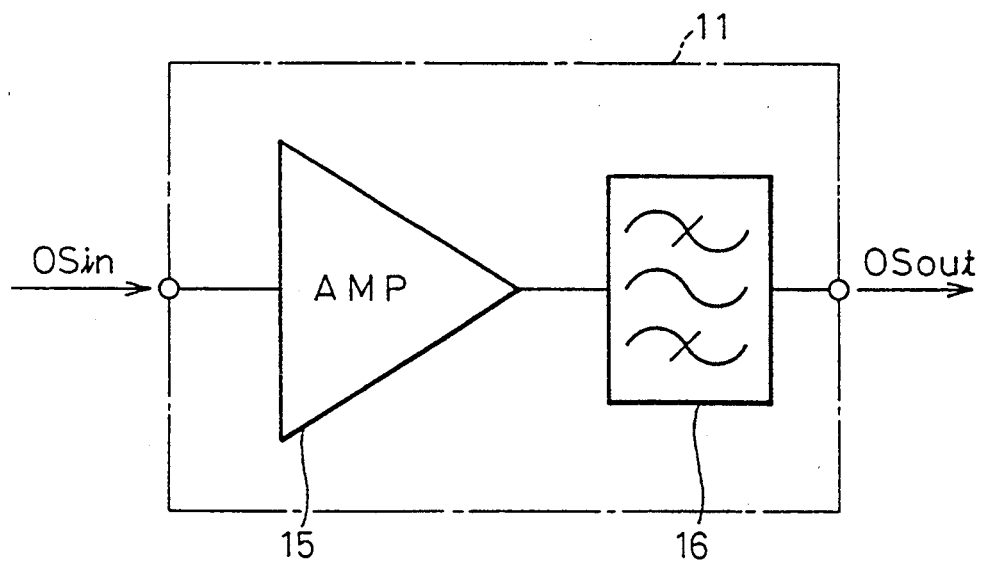
FIG. 3 is a view of the construction of an optical amplifier.

FIG. 3 shows the constitution of the optical amplifiers. The optical amplifiers 11 are each comprised of an optical amplification unit 15 for amplifying the input signal light $OS_{in}$ and an optical filter 16 which has as its main object to produce an output signal light $OS_{out}$ reduced in the amount of ASE.

Figure 4:
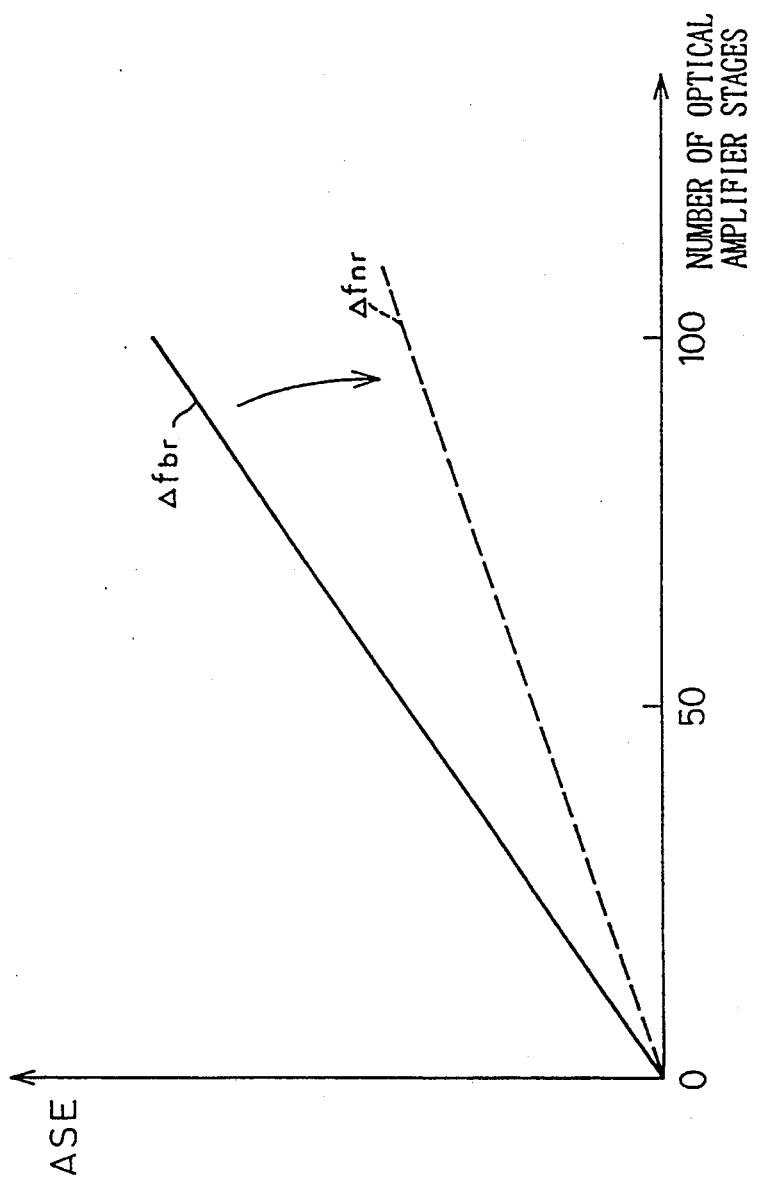
FIG. 4 is a graph of the relationship between the ASE and an optical amplifier using the bandwidth of the optical filter as a parameter.

FIG. 4 is a graph showing the relationship of the ASE and an optical amplifier using as a parameter the bandwidth of the optical filter. The graph of the figure will now be explained with reference to the optical transmission line of FIG. 1. For simplicity, as mentioned before, the optical amplifying gain G and the optical loss L are considered both constant and the ASE is also considered constant. Here, the bandwith of the optical fiber at the n-th (n=1, 2, 3 ... ) optical amplifier 11 counted from the input end IN is set as $\Delta f_n$. This being so, the effective bandwidth $\Delta f_{eff}$ of all the optical filters 16 used until the n-th optical amplifier 11 is reached is generally known to be expressed as:

$$\Delta f_{eff} = [\Sigma(\Delta f_k)^{-2}]^{-\frac{1}{2}} \text{ (where } \Sigma \text{ is } k=1 \text{ to } k=n)$$

This being the case, when the bandwidth of one of the optical filters 16 is constant ($\Delta f_n = \Delta f_c$, $\Delta f_c$ being the constant bandwith), the amount of ASE of the output signal $OS_{out}$ from the n-th optical amplifier 11 and the effective bandwidth $\Delta f_{eff}$ may be expressed by:

$$ASE = 2n(G-1)N_{sp}\Delta f_{eff} = \Delta f_c/n^{\frac{1}{2}}$$

However, $2 \times N_{sp}$ shows the ASE per optical amplifier stage. Further, n is the number of the optical amplifiers 11, whose gains G are generally $G \gg 1$.

Referring to FIG. 4, the graph shows that the amount of ASE increases monotonously with each successively relaying and amplification by the optical amplifiers 11. As already mentioned, along with the monotonous increase in the amount of ASE, the nonlinear effects, such as the Kerr effect, increase. In general, the nonlinear effects are proportional to the optical power of the amount of ASE of the output signal light $OS_{out}$, so the nonlinear effects increase in proportion to the area of the triangular surface enclosed by the characteristic lines and the horizontal axis in the figure.

The triangular area, that is, the integral value of the amount of ASE along with distance, must be reduced. The easiest way to reduce the integral value along with distance is to reduce the bandwidths ($\Delta f_{nr}$) of the optical filters 16 in the optical amplifiers 11 across the board, as mentioned earlier. The characteristic line shown by the dotted line in FIG. 4 shows the amount of ASE when reducing the bandwidths ($\Delta f_{br}$) of the optical filters in the prior art across the board to $\Delta f_{nr}$. The triangular area defined by the solid characteristic line under this $\Delta f_{br}$ is considerably reduced. That is, the nonlinear effects are suppressed. Note that the "br" in $\Delta f_{br}$ means "broad", while the "nr" in $\Delta f_{nr}$ means "narrow".

According to the above easy method of reducing the bandwidths ($\Delta f_n$) of the optical filters 16 across the board, however, a new problem is created. This new problem is that wave distortion ends up occurring in the output signal light $OS_{out}$. This is because if the bandwidths of the optical filters 16 are reduced too much, it is no longer possible to secure the bandwidth necessary for the transmission of the signal light. That is, since the bandwidths of the optical filters 16 are reduced across the board, the result is that a frequency band limitation is applied to the signal light spectrum. That is, even from the viewpoint of the stability of the optical frequency of the light source in the optical transmitter (TX), there is a limit to the reduction of the bandwidths.

A detailed explanation will now be made of the optical transmission line relayed with multistage optical amplifiers of the present invention, which resolves the above problems.

Figure 5:
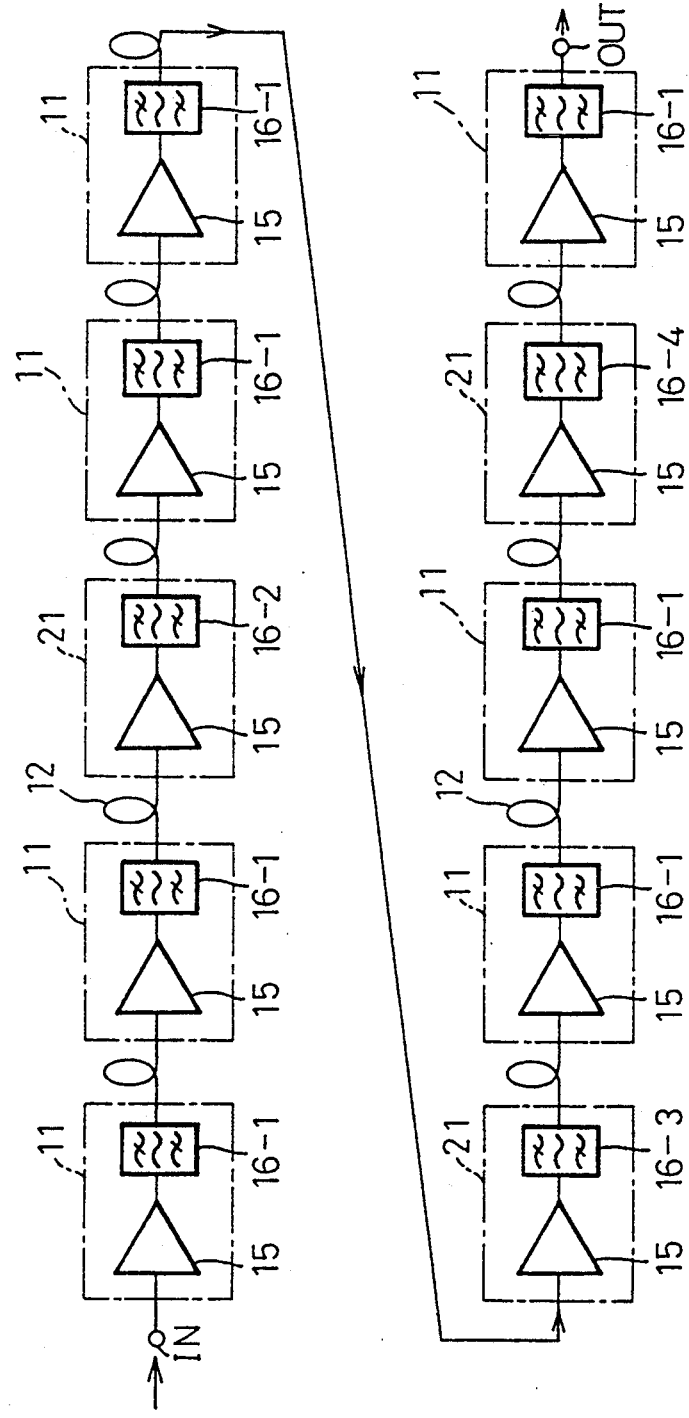
FIG. 5 is a view of the basic constitution according to the present invention.

FIG. 5 shows the basic constitution according to the present invention. According to the optical transmission line 10 relayed with multistage optical amplifiers of the present invention, a plurality of optical amplifiers 11 are provided comprised of a plurality of optical filters 16-1 having bandwidths ($\Delta f_{br}$) required for transmission of signal light and a plurality of optical filters 16-2, 16-3, 16-4 ... including the central frequency of the signal light and having various types of bandwidths ($\Delta f_{nr1}$, $\Delta f_{nr2}$, $\Delta f_{nr3}$, ... ) narrower than the above-mentioned required bandwidth mixed in with the same.

By interposing narrow bandwidths ($\Delta f_{nr1}$, $\Delta f_{nr2}$, $\Delta f_{nr3}$, ... ) here and there among the group of optical filters 16-1 having the usual bandwidth ($\Delta f_{br}$), it is possible to easily optimize the effective combined bandwidth and the amount of ASE compared with the case of making all the optical amplifiers a single type of optical amplifier and therefore it is possible to reduce the amount of ASE without applying that much of a frequency band limitation to the signal light spectrum.

Figure 6:
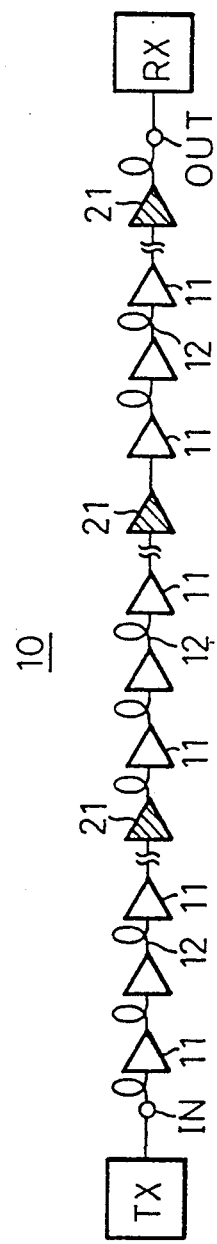
FIG. 6 is a view of an embodiment of an optical transmission line according to the present invention.

FIG. 6 shows an embodiment of an optical transmission line according to the present invention. In the figure, 11 is the above-mentioned first optical amplifier and 21 is the second optical amplifier introduced according to the present invention. That is, the optical transmission line 10 relayed with multistage optical amplifiers according to this embodiment is comprised of a plurality of first optical amplifiers 11 each provided with a broad band optical filter 16-1 including the center frequency $f_0$ of the signal light and having a desired bandwidth $\Delta f_{br}$, a plurality of second optical amplifiers (shown by hatching) 21 each provided with a narrow band optical filter 16-2 including the central frequency $f_0$ of the signal light and having a bandwidth $\Delta f_{nr}$ smaller than the bandwidth of the broad-band optical filters, and an optical transmission line 12 connecting these optical amplifiers 11 and 21.

Figure 7:
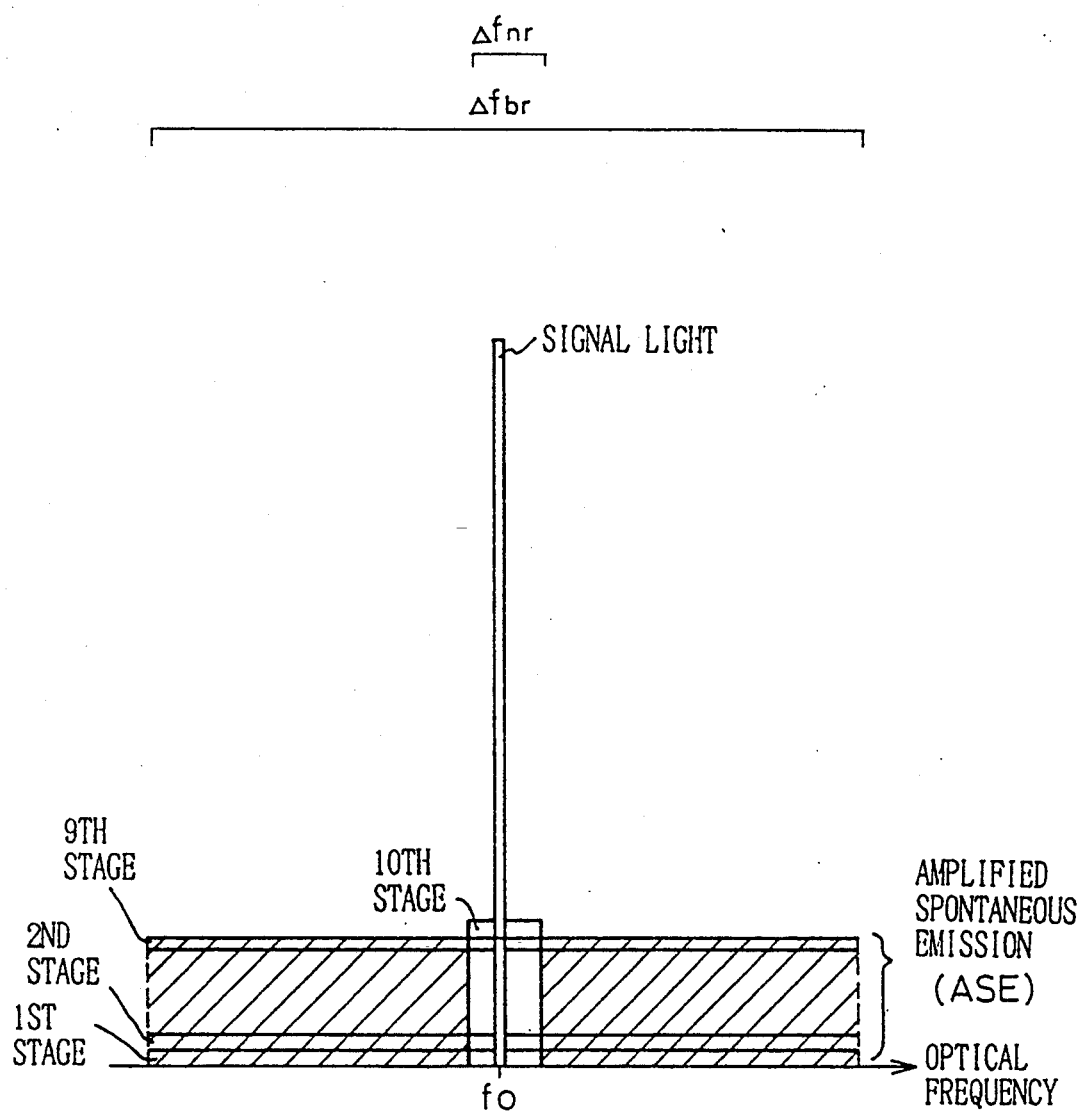
FIG. 7 is a view for explaining the ASE reduction effect in FIG. 6.

FIG. 7 is a view for explaining the effect of reduction of the amount of ASE in FIG. 6 and shows the output light of the n-th stage optical amplifier. The horizontal axis shows the optical frequency, while the vertical axis direction shows the optical power level. In parallel with the axis of the optical frequency, the bandwidth $\Delta f_{br}$ of the broad band optical filters and the bandwidths $\Delta f_{nr}$ of the narrow band optical filters are shown at the top of the figure. The hatched areas in the figure show the state of accumulation of the ASE by the optical amplifiers 11 with the built-in broad band optical filters from the first stage optical amplifier 11 (including broad band optical filter 16-1) to the ninth stage optical amplifier 11 (including broad band optical filter 16-1). The number of stages (9) is only an example.

At the 10th stage second optical amplifier 21 (among the three second optical amplifiers 21 in FIG. 6, corresponding to the optical amplifier at the side nearest the input end IN), the accumulated ASE is cut off by the narrow band optical filter (bandwidth $\Delta f_{nr}$) included within it. However, the signal light having as the central frequency $f_0$ positioned at the center of the bandwidth $\Delta f_{nr}$ or near the same passes through as it is. Here, it is possible to reduce the amount of ASE without applying that much of a frequency band limitation on the signal light spectrum. In this case, it is not possible to provide narrow band optical filters with the bandwidths $\Delta f_{nr}$ for all of the first to the 10th optical amplifiers. The reason is that if all are made narrow band optical filters, the signal light will be transmitted with a band narrower than the desired bandwidth ($\Delta f_{br}$) required for the transmission of the signal light. In the end, the amount of ASE would be reduced, but the basic signal light spectrum would also be reduced and this would invite wave distortion. Therefore, in the conventional optical transmission line (FIG. 1), all the optical amplifiers 11 had to be provided with broad band optical filters.

The phenomenon of FIG. 7 will be explained in more detail using numeral equations. As mentioned earlier, if the bandwidth of the broad band optical filter 16-1 in the first optical amplifier 11 is set as $\Delta f_{br}$ and the bandwith of the narrow band optical filter 16-2 in the second optical amplifier 21 is set as $\Delta f_{nr}$, then $\Delta f_{br} > \Delta f_{nr}$ stands. Here, the ratio (a) between the value of the bandwidth $\Delta f_{nr}$ of the narrow band optical filter 16-2 and the value of the bandwidth $\Delta f_{br}$ of the broad band optical filter 16-1 will be defined. That is, $$a = \Delta f_{br}/\Delta f_{nr}$$

Further, the total number of the optical amplifiers (11, 21) is set as n and the number of the second optical amplifiers 21 having the narrow band optical filters is set as b.

Here, the effective bandwidth $\Delta f_{eff}$ of all the optical amplifiers is $$\Delta f_{eff} = [(n-b)\Delta f_{br}^{-2} + b\Delta f_{nr}^{-2}]^{-\frac{1}{2}}$$

If the above-mentioned $a = \Delta f_{br}/\Delta f_{nr}$ is substituted for the $\Delta f_{br}$ in the equation, then it is possible to express it as:

$$\Delta f_{eff} = \Delta f_{nr}/[(n-b)/a^2 + b]^{\frac{1}{2}}$$

On the other hand, when the bandwidth is a single type such as in FIG. 4, the integral value of the amount of ASE along with distance, that is, the area corresponding to the triangle in FIG. 4, is set as $S_1$, then $S_1$ is expressed as follows using the above-mentioned effective bandwith $\Delta f_{eff}$:

$$S_1 = \tfrac{1}{2} \cdot \Delta f_{eff} \cdot n^{\frac{1}{2}} \cdot n^2$$

As opposed to this, as shown in FIG. 6, when assembling two different types of filters, that is, the broad band and narrow band filters, and, as shown in FIG. 6, when inserting and disposing the second optical amplifiers 21 in the plurality of first optical amplifiers 11 at substantially equal intervals, the integral value $S_2$ of the amount of ASE along with distance can be expressed as $$S_2 = \tfrac{1}{2} \cdot \Delta f_{eff} [(n-b)/a^2 + b]^{\frac{1}{2}}] 1 + (a-1)/b] \cdot n^2$$

Further, if the ratio of the $S_1$ and $S_2$ is used as an evaluation function, the evaluation function $S_2/S_1$ can be expressed as:

$$S_2/S_1 = [(n-b)/a^2 + b]^{\frac{1}{2}} \cdot [1 + (a-1)/b]/n^{\frac{1}{2}}$$

If the bandwidths ($\Delta f_{br}$ and $\Delta f_{nr}$) of the broad band optical filters 16-1 and the narrow band optical filters 16-2 are set and the number (b) of the narrow-band optical filters is set in accordance with the optimal value $a_0$ of the above value a obtained based on this evaluation function ($S_2/S_1$) and the optimal value $b_0$ of the above-mentioned value b, the amount of ASE can be reduced without applying too large a frequency band limitation to the spectrum of the signal light. In the above case, the above-mentioned values a and b when the $S_2/S_1$ is made minimum form the optimal values $a_0$ and $b_0$, respectively.

The invention will be explained below using specific examples.

Figure 8:
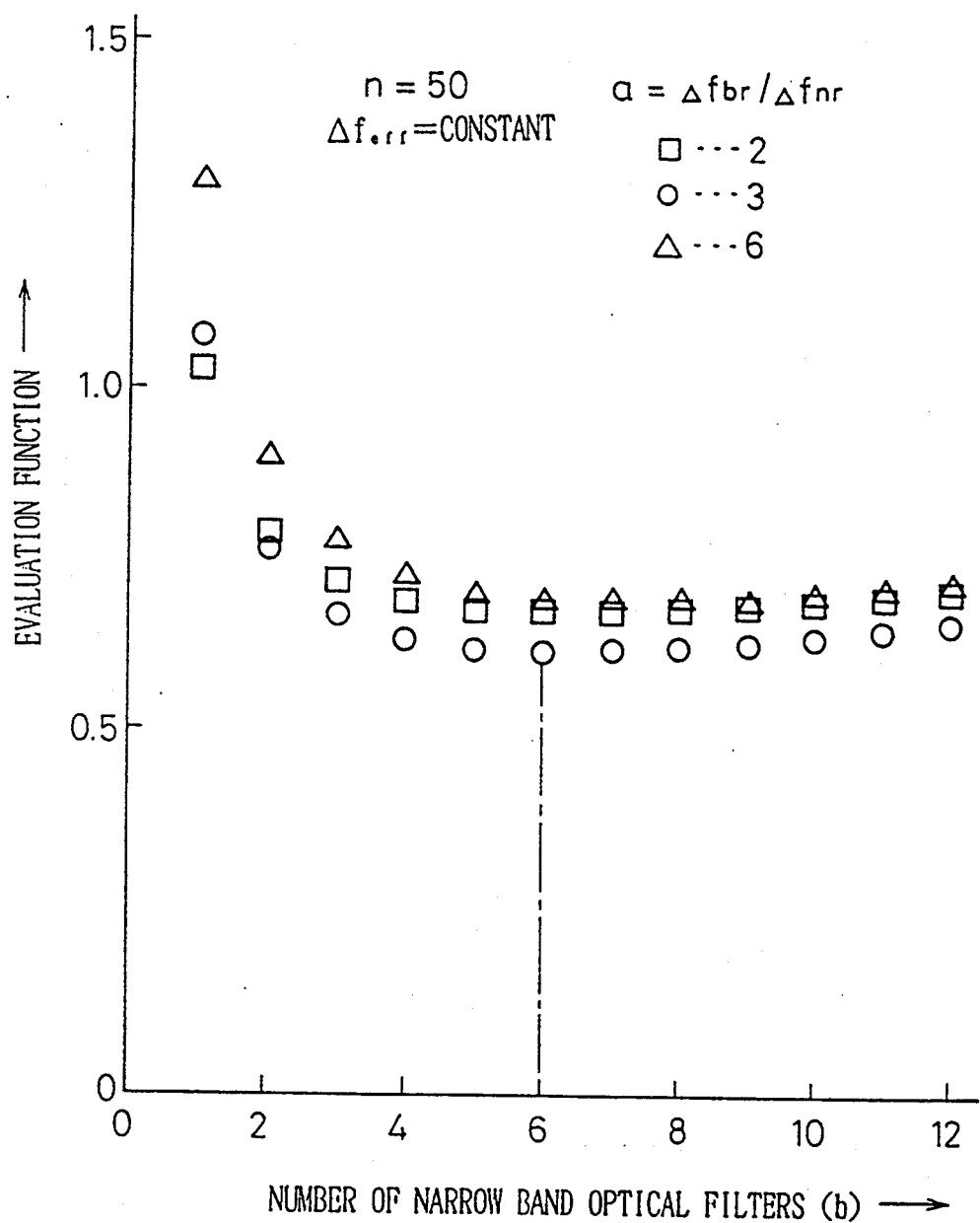
FIG. 8 is a view of the relationship between the value b and an evaluation function using the value a as a parameter.

FIG. 8 is a view of the relationship of the value b and the evaluation function using the value a as a parameter. As the ratio a ($= \Delta f_{br}/\Delta f_{nr}$), three types which may be selected (a=2, a=3, a=6) are shown. The total number n of the optical amplifiers, however, is made 50 and the effective bandwidth $\Delta f_{eff}$ is made constant. According to what is shown by the calculation data of this figure, the values a and b giving the smallest value of the evaluation function are a=3 and b=6, it is learned. That is, it is most suitable when the ratio a of the bandwidth ($\Delta f_{nr}$) of the narrow-band optical filter 16-2 and the bandwidth ($\Delta f_{br}$) of the broad-band optical filter 16-1 is 3 and of the total 50 optical amplifiers, the number of of narrow band optical filters is six.

Figure 9:
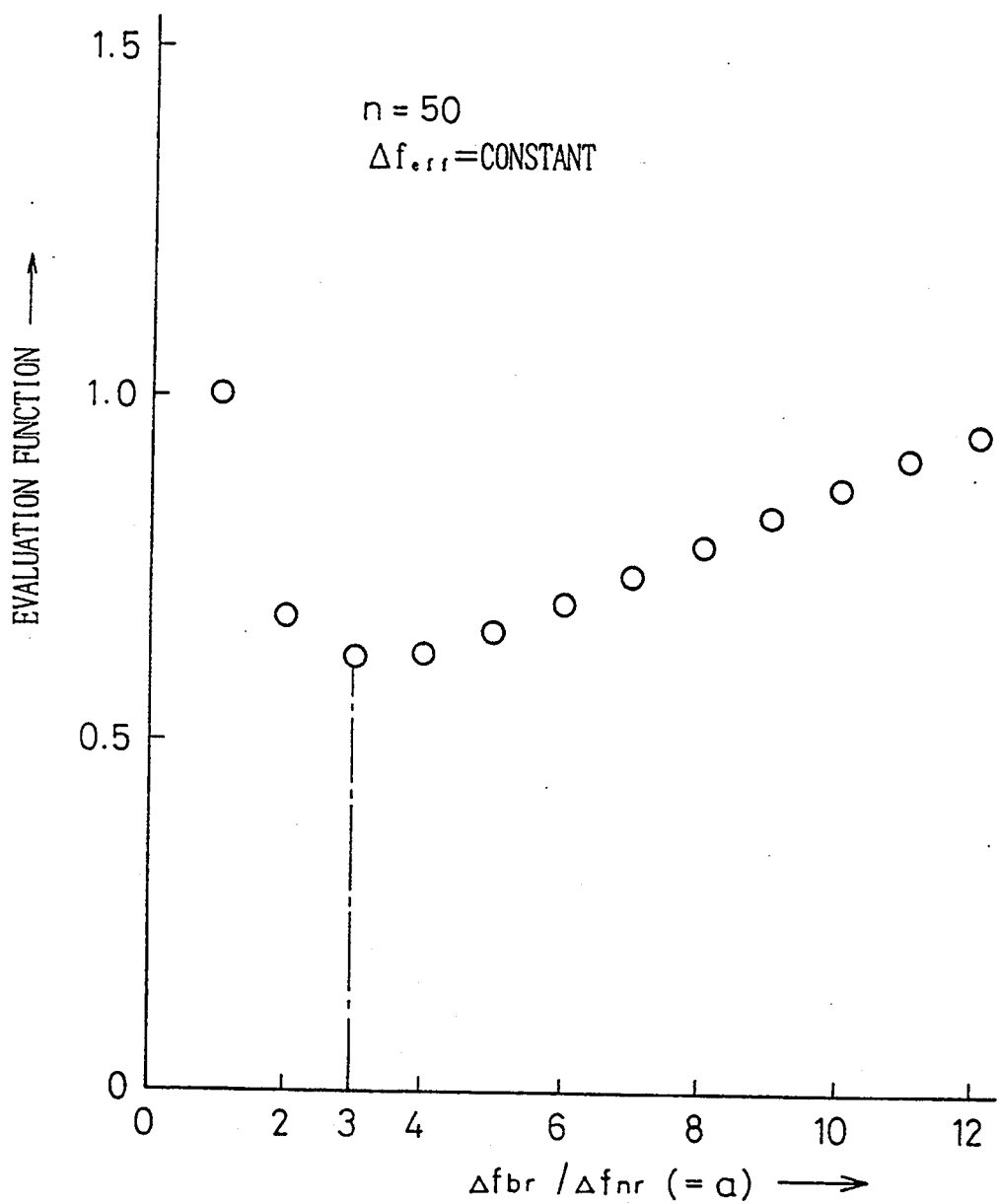
FIG. 9 is a view of the relationship between the value a and the evaluation function.

FIG. 9 shows the relationship between the value a and the evaluation function. This shows the changes in the value of the evaluation function when the value b obtained in FIG. 8 is 6 and the ratio a is made variable. The conditions that n=50 and $\Delta f_{eff}$ is constant are the same as in the case of FIG. 8. According to what is shown by the calculation data of the figure, the value a giving the smallest value of the evaluation function is found to be a=3. That is, it was confirmed that it is most suitable when the ratio a ($= \Delta f_{br}/\Delta f_{nr}$) of the bandwidth ($\Delta f_{nr}$) of the narrow band optical filter 16-2 and the bandwidth ($\Delta f_{br}$) of the broad band optical filter 16-1 is 3.

Figure 10:
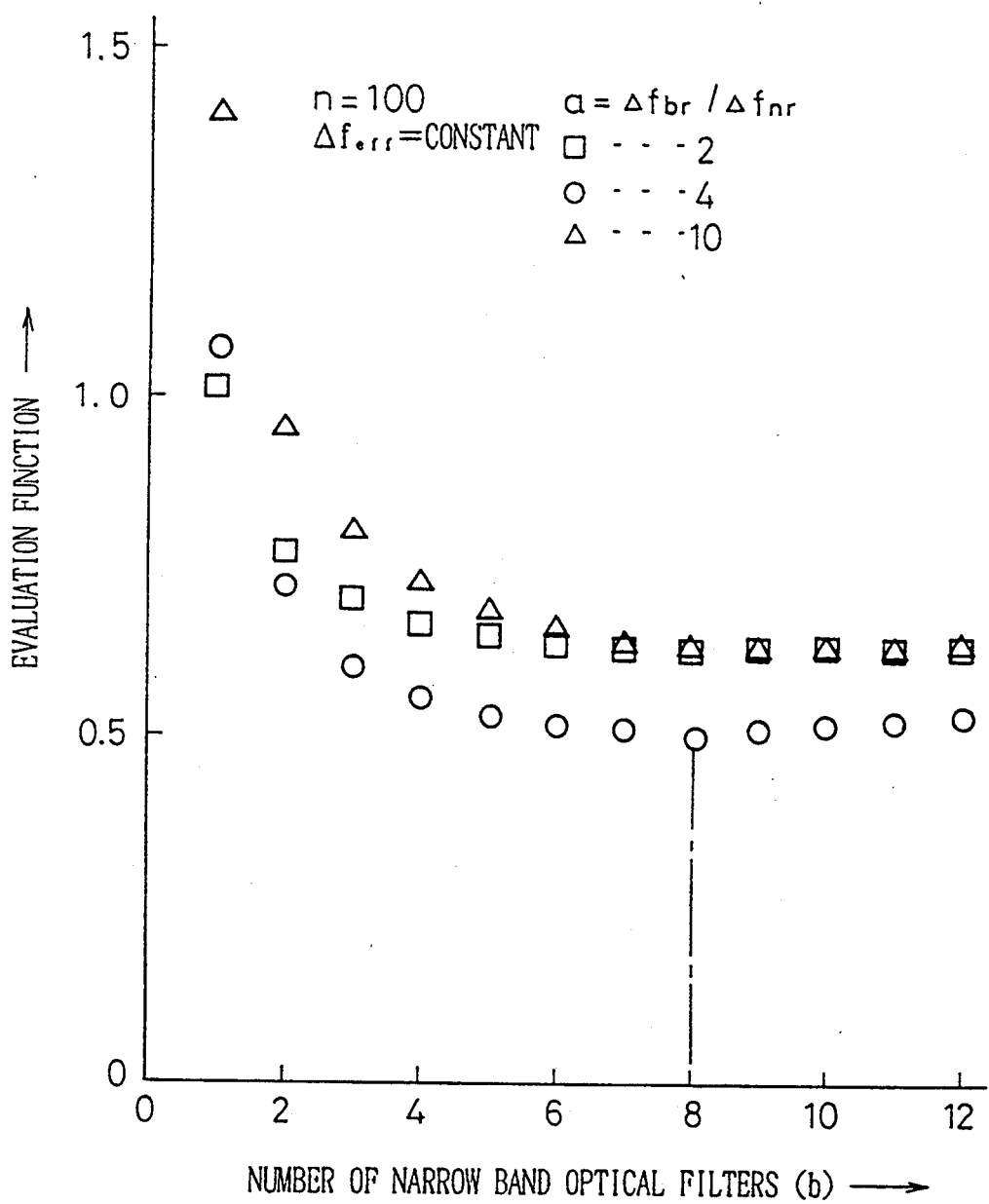
FIG. 10 is a view of the relationship between the value b and the evaluation function using the value a as a parameter.

FIG. 10 shows the relationship between the value b and the evaluation function using the value a as a parameter. As the ratio a ($=\Delta f_{br}/\Delta f_{nr}$), three types which may be selected (a=2, a=4, a=10) are shown. The total number n of the optical amplifiers, however, is made 100 and the effective bandwidth $\Delta f_{eff}$ is made constant. According to what is shown by the calculation data of this figure, the values a and b giving the smallest value of the evaluation function are a=4 and b=8, it is learned. That is, it is most suitable when the ratio a of the bandwidth ($\Delta f_{nr}$) of the narrow band optical filter 16-2 and the bandwidth ($\Delta f_{br}$) of the broad band optical filter 16-1 is 4 and of the total 100 optical amplifiers, the number of of narrow band optical filters is eight.

Figure 11:
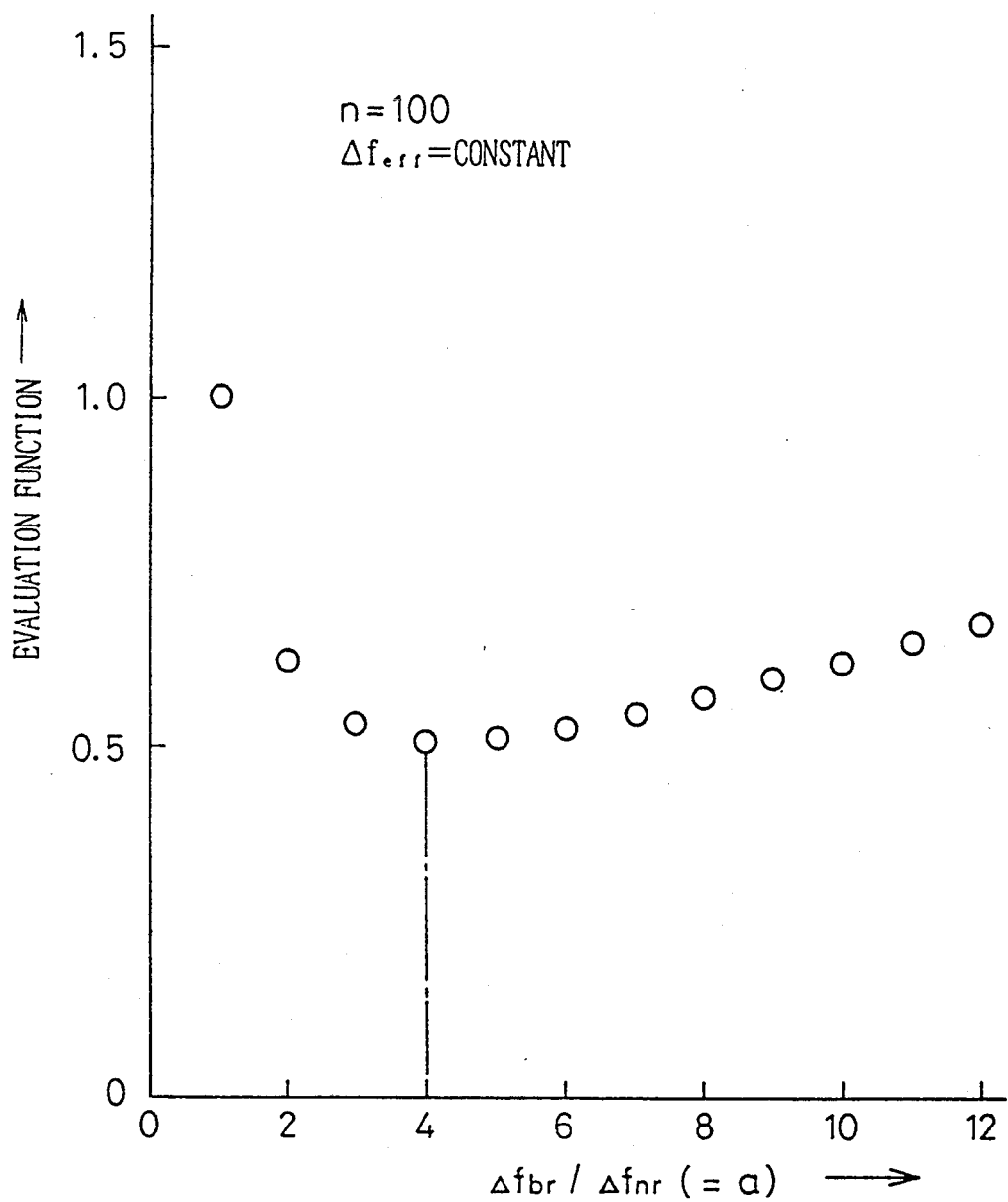
FIG. 11 is a view of the relationship between the value a and the evaluation function.

FIG. 11 shows the relationship between the value a and the evaluation function. This shows the changes in the value of the evaluation function when the value b obtained in FIG. 8 is eight and the ratio a is made variable. The conditions that n=100 and $\Delta f_{eff}$ is constant are the same as in the case of FIG. 10. According to what is shown by the calculation data of the figure, the value a giving the smallest value of the evaluation function is found to be a=4. That is, it was confirmed that it is most suitable when the ratio a ($=\Delta f_{br}/\Delta f_{nr}$) of the bandwidth ($\Delta f_{nr}$) of the narrow band optical filter 16-2 and the bandwidth ($\Delta f_{br}$) of the broad band optical filter 16-1 is 4.

Figure 12:
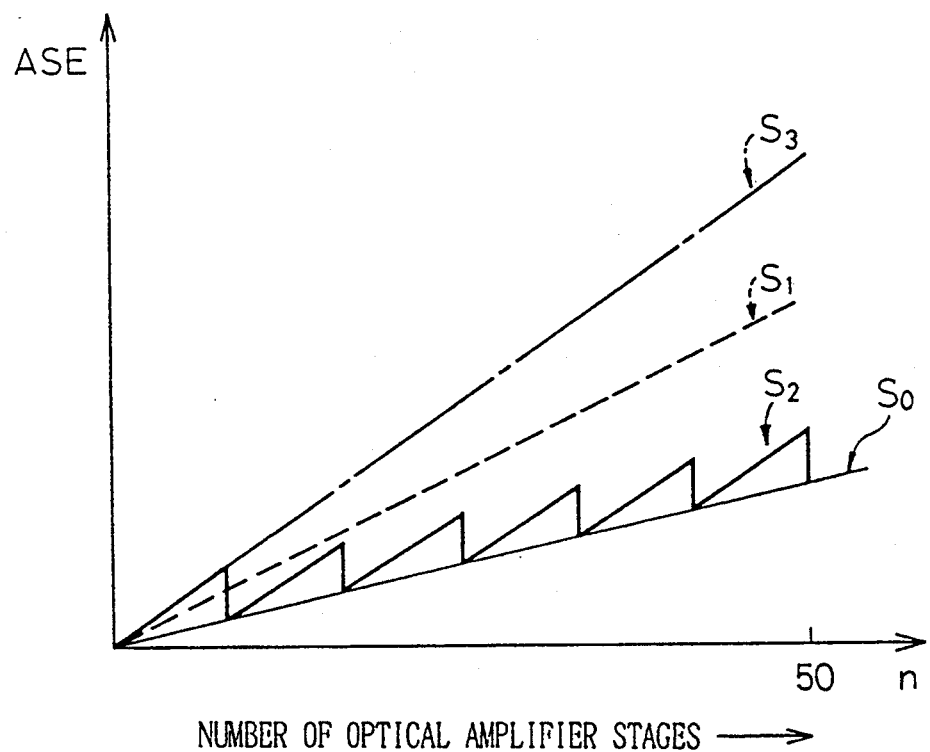
FIG. 12 is a view of the results of simulation using the optimal value obtained in FIG. 8.

FIG. 12 shows the results of a simulation using the optimum values obtained in FIG. 8. That is, when the total number n of optical amplifiers 11 is 50, the number b of the narrow band optical filters is six, and the value a of the ratio of the bandwidth of the broad band optical filter and the narrow band optical filter is 3, the results of the simulation were that it is possible to reduce the ASE without applying that large a limitation to the frequency band of the signal light spectrum. The horizontal axis in the figure shows the number of stages of the optical amplifiers 11 and 21 from the input end IN to the output terminal OUT along the optical transmission line 12. The vertical axis shows the accumulated value of the amount of the ASE. Here, $S_3$ shows the integral value of the amount of ASE along with distance in the case of using only broad band optical filters, $S_0$ shows the integral value of the amount of ASE along with distance in the case of using only narrow band optical filters, and $S_2$ shows the area defined with the horizontal axis when mixing the two types of broad and narrow band optical filters. The latter is the integral value $S_2$ of the amount of ASE along with distance mentioned earlier. Further, $S_1$ is the (prior art) integral value of amount of ASE along with distance in the case of using only one type of optical filter corresponding to an effective bandwidth $\Delta f_{eff}$. From this figure, it is understood that the effect of reduction of the amount of ASE by the present invention is great.

Calculated more specifically, the evaluation function $S_2/S_1$ is 0.62 and the amount of ASE is reduced as much as 38 percent.

Figure 13:
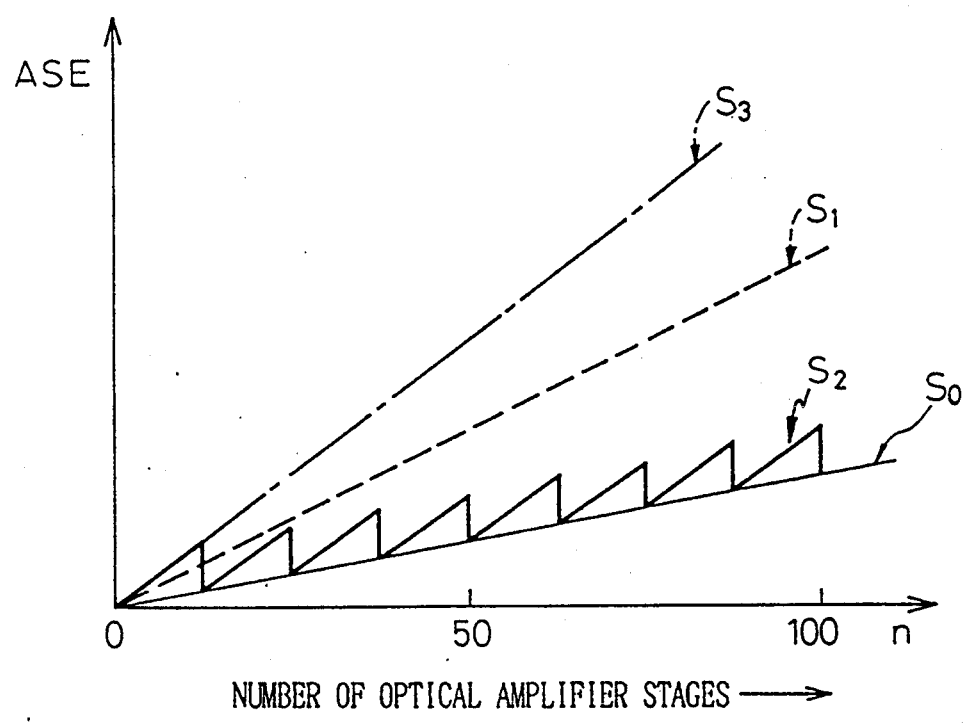
FIG. 13 is a view showing the results of simulation using the optimal value obtained in FIG. 10.

FIG. 13 shows the results of a simulation using the optimum values obtained in FIG. 10. That is, when the total number n of optical amplifiers is 100, the number b of the narrow band optical filters is eight, and the value a of the ratio of the bandwidths of the broad band optical filter and the narrow band optical filter is 4, the results of the simulation were that it is possible to reduce the ASE without applying that large a limitation to the frequency band of the signal light spectrum. The horizontal axis and the vertical axis in the figure and the symbols $S_1$, $S_2$, and $S_3$ has the same meanings as in FIG. 12. As clear from the $S_2$ in the results of the simulation, when two types of broad and narrow band optical filters are mixed, the area defined with the horizontal axis, that is, the integral value of the amount of ASE along with distance, mentioned earlier, becomes minimum.

According to a more specific calculation, the evaluation function $S_2/S_1$ becomes 0.51 and it is possible to reduce the amount of ASE 49 percent as well.

Note that experimental findings on the state of the art of long distance optical communication were reported in the 17th European Conference on Optical Communication ECOC'91, Post-Deadline Papers; Page 68, S. Saito et al. According to this report, success was achieved in optical communication at a transmission distance of 4500 km at a transmission speed of 2.5 Gb/s by connecting multistages of optical amplifiers in cascade in an intensity-modulation direct detection (IM/DD) system. Further, success was achieved with optical communication at a transmission distance of 2500 km at a transmission speed of 2.5 Gb/s by connecting multistages of optical amplifiers in cascade in a coherent optical communication (heterodyne detection) system.

According to the above-mentioned experimental report, the effective bandwith $\Delta f_{eff}$ when relaying in n stages using a uniform bandwidth of 3 nm (373 GHz) becomes:

[1] When n=50, $\Delta f_{eff}$=52.8 GHz
[2] When n=100, $\Delta f_{eff}$=37.3 GHz On the other hand, if the required frequency band of the optical receiver (RX) is made about 3 GHz, the effective bandwidth $\Delta f_{eff}$ required of the optical filter 16 has to be about 6 GHz, double that amount. Therefore, if the bandwidths of the optical filters 16-1 and 16-2 giving a $\Delta f_{eff}$ of 6 GHz are sought,

[1] When n=50, $\Delta f_{br}$=59.4 GHz and $\Delta f_{nr}$=19.8 GHz
[2] When n=100, $\Delta f_{br}$=89.0 GHz and $\Delta f_{nr}$=22.3 GHz According to the present invention, if use is made of the above numeral example, first the effect of reduction of the ASE by reducing the bandwidths of the optical filters by using one type of optical filter is 6/52.8 when n=50 and 6/37.3 when n=100. Further, the effect of reduction of the ASE by using two types of optical filters is 0.62 when n=50 and 0.51 when n=100. Due to this multiplier effect, the integral value of the amount of ASE along with distance is reduced as follows:

[1] When n=50, (6/52.8)×0.62=0.070
[2] When n=100, (6/37.3)×0.51=0.082

Giving another numerical example, in the case of fixing the broad bandwidth $\Delta f_{br}$=373 GHz (3 nm), if use is made of 25 (b=25) narrow band optical filters with narrow bandwidths of $\Delta f_{nr}$=31.1 GHz, the value of the evaluation function ($S_2/S_1$) becomes $$S_2/S_1 = 0.73$$

and the integral value of the amount of ASE along with distance is reduced to $$(6/37.3) \times 0.73 = 0.117$$

In the embodiment explained above, the effect of the reduction of the ASE was evaluated by the value of the ratio of the integral values of the amount of ASE along with distance as $S_1$ and $S_2$. In this case, in general, the saturation output of the optical amplifiers is expressed by the sum of the ASE and the signal light power, so if the ASE increases to an extent where it can no longer be ignored compared with the signal light power, the signal light power ends up being decreased by that amount. Therefore, to prevent a reduction of the signal light power in this way, it is necessary to keep the ASE from exceeding a certain threshold.

Figure 14:
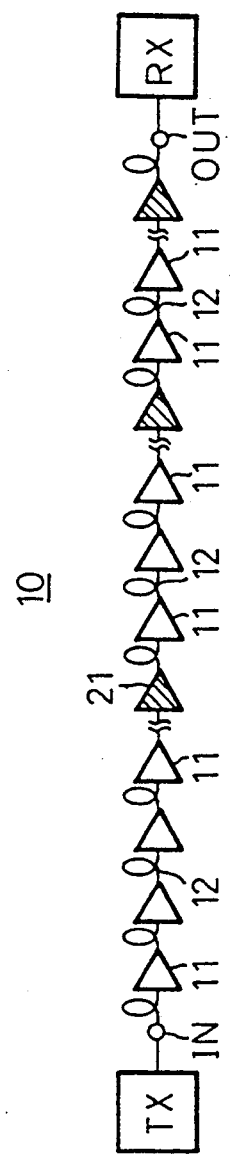
FIG. 14 is a view of another embodiment of an optical transmission line according to the present invention.

FIG. 14 shows another embodiment of an optical transmission line according to the present invention and corresponds to FIG. 6. According to the embodiment shown here, to prevent the reduction of the signal light power, the distance for arrangement of the narrow band optical filters 16-2 is made smaller as the proximity to the output terminal OUT of the optical transmission line 12 is reduced. This keeps the ASE power from exceeding a certain threshold. By way of reference, in FIG. 6, the second optical amplifiers 21 are disposed at the same pitch in the group of first optical amplifiers (11).

Figure 15:
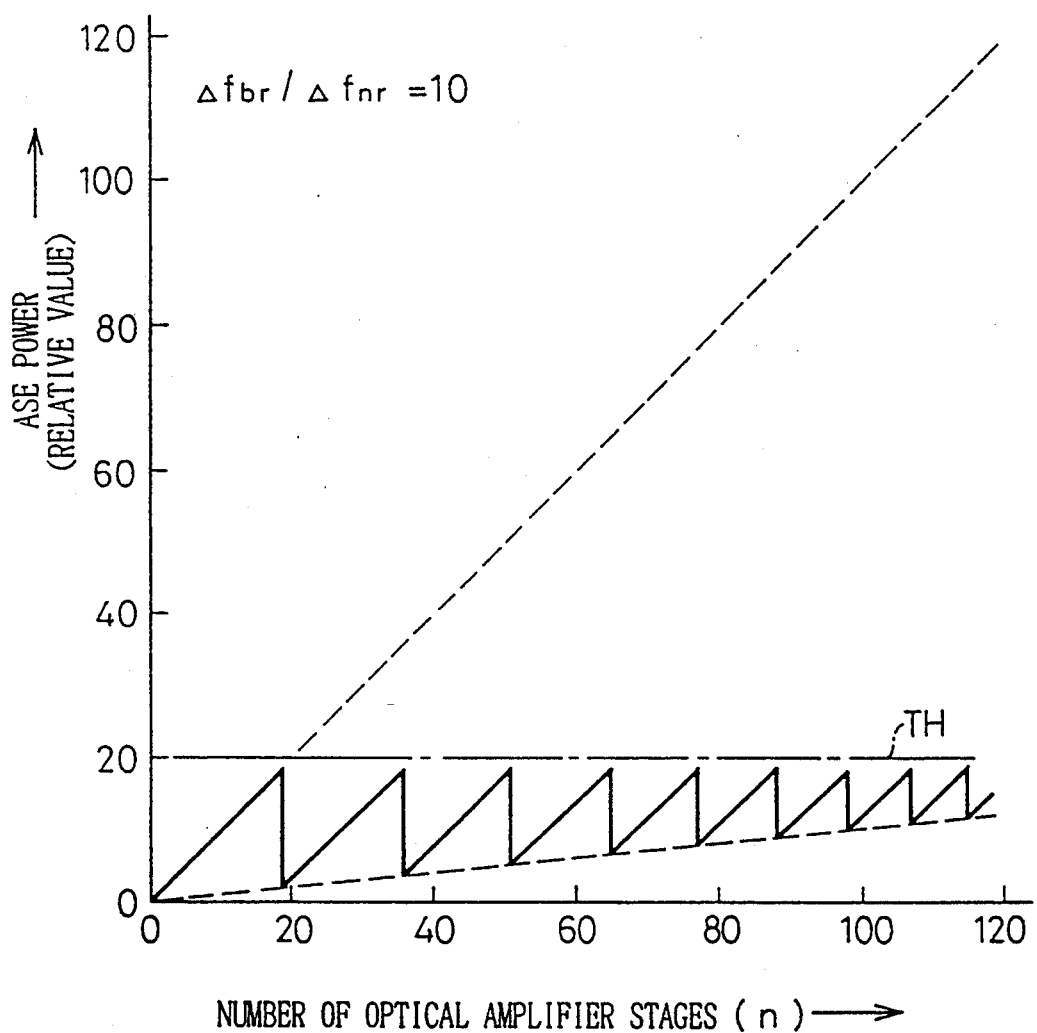
FIG. 15 is a view of the changes in the ASE power in FIG. 14.

FIG. 15 is a view of the changes in the ASE power in FIG. 14. The horizontal axis shows the number of stages of the optical amplifiers. The distance for insertion of the second optical amplifiers 21 becomes gradually smaller toward the right end. This prevents the ASE power from exceeding a certain threshold.

Figure 16:
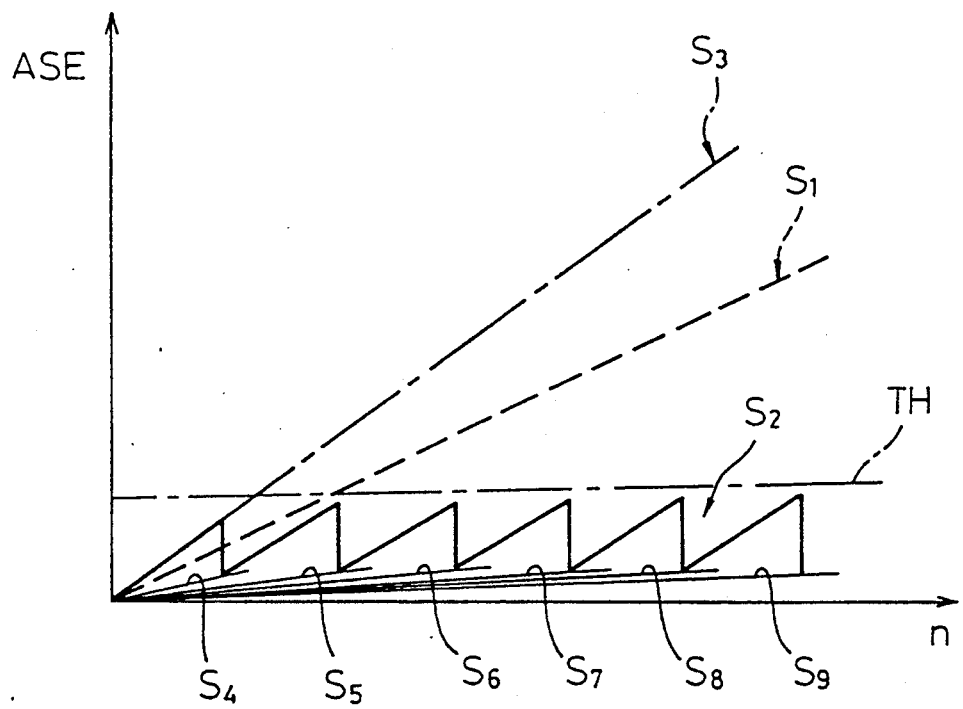
FIG. 16 is a view of an example wherein a similar change is obtained as with the change of the ASE power shown in FIG. 15 by gradually making narrower the bandwidths of the narrow band optical filters.

A similar effect to that shown in FIG. 15 can be obtained by gradually decreasing the bandwidths ($\Delta f_{nr}$) of the narrow band optical filters 16-2, 16-3 ... (FIG. 5) toward the right end of FIG. 15 while holding the distance of the insertion position of the second optical amplifiers 21 constant. FIG. 16 shows this. The area $S_0$ in the case of use of the narrow band optical filter shown in FIG. 13 gradually becomes smaller, such as the area $S_4$ and the area $S_5$ ..., by gradually reducing the bandwidths ($\Delta f_{nr}$) toward the right side. As a result, the ASE power is kept from exceeding a certain threshold TH.

As explained above, according to the present invention, it is possible to reduce the amount of ASE without applying any major frequency band limitation to the signal light spectrum. For example, in the abovementioned experimental report, there is the possibility that the optical communication distance of 4500 km reached in the above-mentioned experimental report can be extended to about 10,000 km.

I claim:

1. An optical transmission system for transmitting a signal, the signal has a center frequency and the optical transmission system comprising:

an optical transmission line having an input terminal which receives the signal, and an output terminal; and a plurality of optical amplifying units concatenated into the optical transmission line, the signal being received by the input terminal of the optical transmission line, transmitted through the optical transmission line by passing through each of the optical amplifying units and output from the output terminal of the optical transmission line, wherein:

each optical amplifying unit comprises an optical amplifier and an optical filter to provide a plurality of optical filters concatenated into the optical transmission line, and the concatenated optical filters include a plurality of the first-type optical filters which respectively pass the center frequency of the signal and have a respective bandwidth which passes the signal received at the input terminal of the optical transmission line, and a plurality of second-type optical filters which pass the center frequency of the signal and have a respective bandwidth which is narrower than the respective bandwidths of the first-type optical filters, optical amplifying units being arranged in the optical transmission line to form a concatenated mixture of first-type optical filters and second-type optical filters.

2. An optical transmission system as set forth in claim 1, wherein the plurality of optical amplifying units comprise:

a plurality of first-type optical amplifying units, each comprising an optical amplifier and a first-type optical filter, the first-type optical filter being a broad band optical filter; and a plurality of second-type optical amplifying units, each comprising an optical amplifier and a second-type optical filter, the second-type optical filter being a narrow band optical filter.

3. An optical transmission system as set forth in claim 2, wherein:

a plurality of groups of first-type optical amplifying units are inserted into the optical transmission line, each group comprising m first-type optical amplifying units arranged in series without a second-type optical amplifying unit between the m first-type optical amplifying units, where m is an integer, and a second-type optical amplifying unit is inserted into the optical transmission line after each group of m first-type optical amplifying units.

4. An optical transmission system as set forth in claim 3, wherein a predetermined evaluation function for determining the amount of amplified spontaneous emission generated along the optical transmission line is a function of the bandwidth of the narrow band optical filters, the bandwidth of the broad band optical filters, the number of narrow band optical filters and the total number of broad band optical filters and narrow band optical filters, where:

the bandwidth of the narrow band optical filters equals $\Delta f_{nr}$, the bandwidth of the broad band optical filters equals $\Delta f_{br}$, the ratio of $\Delta f_{br}/\Delta f_{nr}$ equals a, the number of narrow band optical filters equals b, and the total number of the broad band optical filters and narrow band optical filters equals n, and an optimum value $a_0$ of the above value a and an optimum value $b_0$ of the above value b are determined by minimizing the evaluation function, and the bandwidths of the broad band optical filters, the bandwidths of the narrow band optical filters and the number of narrow band optical filters are set to correspond with $a_0$ and $b_0$.

5. An optical transmission system as set forth in claim 4, wherein:

the integral value of the amount of amplified spontaneous emission along with distance obtained by integrating the amplified spontaneous emission generated in the first-type optical amplifiers and second-type optical amplifiers along the optical transmission line from the input terminal to the output terminal of the optical transmission line is set as S, the integral value of the amount of amplified spontaneous emission along with distance is equal to $S_M$ in the case where the first-type optical amplifying units and the second-type optical amplifying units each have the same effective bandwidth of $\Delta f_{eff}$, the integral value of the amount of amplified spontaneous emission along with distance is equal to $S_2$ in the case where the first-type optical amplifying units have a bandwidth equal to $\Delta f_{br}$ and the second-type optical amplifying units each have a bandwidth equal to $\Delta f_{nr}$, and the evaluation function is expressed by the ratio of $S_2/S_1$.

6. An optical transmission system as set forth in claim 5, where the evaluation function is equals $$[(n-b)/a^2+b]^{\frac{1}{2}} \cdot [1+(a-1)/b]/n^{\frac{1}{2}}$$

and the values a and b when the value of the evaluation function is made minimum are used as the optimum values $a_0$ and $b_0$.

7. An optical transmission system as set forth in claim 2, wherein a respective optical amplifying unit is defined as preceding respective optical amplifying units which are positioned farther along the optical transmission line from the input terminal and, as the proximity to the output terminal of the optical transmission line is reduced, the respective second-type optical amplifying units are inserted into the optical transmission line at reduced distances from a respective, adjacent, preceding first-type optical amplifying unit, as compared to the distance between respective second-type optical amplifying units and respective, adjacent, preceding first-type optical amplifying units positioned further from the output terminal of the optical transmission line.

8. An optical transmission system as set forth in claim 1, wherein the optical amplifying units are distributed along the optical transmission line so that the integrated value of the amplified spontaneous emission from each optical amplifying unit does not exceed a predetermined threshold.

9. An optical transmission system as set forth in claim 6, wherein n equals 50, the effective bandwidth $\Delta f_{eff}$ is constant, and the optimum values $a_0$ and $b_0$ are three and six, respectively.

10. An optical transmission system as set forth in claim 6, wherein n equals 100, the effective bandwidth $\Delta f_{eff}$ is constant, and the optimum values $a_0$ and $b_0$ are four and eight, respectively.

11. An optical transmission system as set forth in claim 1, wherein the transmission rate of the signal is expressible by a bit rate and the bandwidth of the first-type optical filters is greater than or equal to twice the bit rate of the signal.

12. An optical transmission system as set forth in claim 11, wherein the plurality of optical amplifying units comprise:

a plurality of first-type optical amplifying units, each comprising a respective optical amplifier and a respective first-type optical filter, the first-type optical filter being a broad band optical filter; and a plurality of second-type optical amplifying units, each comprising a respective optical amplifier and a respective second-type optical filter, the second-type optical filter being a narrow band optical filter.

13. An optical transmission system as set forth in claim 12, wherein:

a plurality of groups of first-type optical amplifying units are inserted into the optical transmission line, each group comprising m first-type optical amplifying units arranged in series without a second-type optical amplifying unit between the m first-type optical amplifying units, where m is an integer, and a second-type optical amplifying unit is inserted into the optical transmission line after each group of m first-type optical amplifying units.

14. An optical transmission system as set forth in claim 13, wherein a predetermined evaluation function for determining the amount of amplified spontaneous emission generated along the optical transmission line is a function of the bandwidth of the narrow band optical filters, the bandwidth of the broad band optical filters, the number of narrow band optical filters and the total number of broad band optical filters and narrow band optical filters, where:

the bandwidth of the narrow band optical filters equals $\Delta f_{nr}$, the bandwidth of the broad band optical filters equals $\Delta f_{br}$, the ratio of $\Delta f_{br}/\Delta f_{nr}$ equals a, the number of narrow band optical filters equals b, the total number of the broad band optical filters and narrow band optical filters equals n, and an optimum value $a_0$ of the above value a and an optimum value $b_0$ of the above value b are determined by minimizing the evaluation function, and the bandwidths of the broad band optical filters, the bandwidths of the narrow band optical filters and the number of narrow band optical filters are set to correspond with $a_0$ and $b_0$.

15. An optical transmission system as set forth in claim 14, wherein:

the integral value of the amount of amplified spontaneous emission along with distance obtained by integrating the amplified spontaneous emission generated in the first-type optical amplifiers and second-type optical amplifiers along the optical transmission line from the input terminal to the output terminal of the optical transmission line is set as S, the integral value of the amount of amplified spontaneous emission along with distance is equal to $S_1$ in the case where the first-type optical amplifying units and the second-type optical amplifying units each have the same effective bandwidth of $\Delta f_{eff}$, the integral value of the amount of amplified spontaneous emission along with distance is equal to $S_2$ in the case where the first-type optical amplifying units have a bandwidth equal to $\Delta f_{br}$ and the second-type optical amplifying units each have a bandwidth equal to $\Delta f_{nr}$, and the evaluation function is expressed by the ratio of $S_2/S_1$.

16. A narrow band optical amplifying unit for use in an optical transmission system which transmits a signal, the signal having a center frequency and the optical transmission system comprising an optical transmission line having an input terminal which receives the signal, and an output terminal, and a plurality of broad band optical amplifying units concatenated into the optical transmission line, the signal being received by the input terminal of the optical transmission line, transmitted through the optical transmission line by passing through each of the broad band optical amplifying units and output from the output terminal of the optical transmission line, each broad band optical amplifying unit comprising an optical amplifier and an broad band optical filter which passes the center frequency of the signal and has a respective bandwidth that passes the signal received at the input terminal of the optical transmission line, the narrow band optical amplifying unit comprising:

an optical amplifier; and a narrow band optical filter which passes the center frequency of the signal and has a respective bandwidth that is narrower than the respective bandwidths of the broad band optical filters, wherein the narrow band optical amplifying unit is interposed into the optical transmission line with at least one broad band optical amplifying unit positioned between the input terminal of the optical transmission line and the narrow band optical amplifying unit.

17. A narrow band optical amplifying unit as in claim 16, wherein the transmission rate of the signal is expressible by a bit rate and each broad band optical amplifying unit comprises an optical filter with a bandwidth greater than or equal to twice the bit rate of the signal.

18. A broad band optical amplifying unit for use in an optical transmission system which transmits a signal, the signal having a center frequency and the optical transmission system comprising an optical transmission line having an input terminal which receives the signal, and an output terminal, and a plurality of narrow band optical amplifying unit concatenated into the optical transmission line, the signal being received by the input terminal of the optical transmission line, transmitted through the optical transmission line by passing through each of the narrow band optical amplifying units and output from the output terminal of the optical transmission line, each narrow band optical amplifying unit comprising an optical amplifier and a narrow band optical filter which passes the center frequency of the signal, the broad band optical amplifying unit comprising:

an optical amplifier; and a broad band optical filter which passes the center frequency of the signal and has a respective bandwidth which passes the signal and is greater than the respective bandwidths of the narrow band optical filters, wherein the broad band optical amplifying unit is interposed into the optical transmission line with at least one narrow band optical amplifying unit positioned between the input terminal of the optical transmission line and the broad band optical amplifying unit.

19. A broad band optical amplifying unit as in claim 18, wherein the transmission rate of the signal is expressible by a bit rate and each broad band optical amplifying unit comprises an optical filter with a bandwidth greater than or equal to twice the bit rate of the signal.

* * * * *

UNITED STATES PATENT AND TRADEMARK OFFICE
CERTIFICATE OF CORRECTION

PATENT NO. : 5,422,754
DATED : June 6, 1995
INVENTOR(S) : Takao NAITO

It is certified that error appears in the above-indentified patent and that said Letters Patent is hereby corrected as shown below:

<u>Column 6</u>

Line 7, "$\Delta f_{eff}.$" should be --$\Delta f_{eff}$:--;

Line 9, "$S_1 = \frac{1}{2} - \Delta f_{eff} n^{\frac{1}{2}} \cdot n_2$" should be --$S_1 = 1/2 \cdot \Delta f_{eff} \cdot n^{1/2} \cdot n^2$--.

Line 19, "$S_2 = \frac{1}{2} \cdot \Delta f_{eff} [(n-b)/a_2+b]_{\frac{1}{2}}] 1+(a-1)/b] - n_2$" should be --$S_2 = 1/2 \cdot \Delta f_{eff} [(n-b)/a^2+b]^{1/2} \cdot [1+(a-1)/b] \cdot n^2$--.

<u>Column 10</u>

Line 65, "is equal to $S_M$" should be --is equal to $S_1$--.

Signed and Sealed this

Twenty-first Day of November, 1995

Attest:

BRUCE LEHMAN

Attesting Officer    Commissioner of Patents and Trademarks